United States Patent [19]
Mehta et al.

[11] Patent Number: 5,883,449
[45] Date of Patent: Mar. 16, 1999

[54] CEILING FAN MOTORS

[75] Inventors: Vinay Mehta; Scott P. Bojko, both of Germantown; Richard A. Pearce; Marshall Sexton, both of Memphis, all of Tenn.

[73] Assignee: Hunter Fan Company, Memphis, Tenn.

[21] Appl. No.: 692,972

[22] Filed: Aug. 7, 1996

[51] Int. Cl.$^6$ .............................. H02K 9/02; H02K 9/04; F04D 29/64

[52] U.S. Cl. ........................... 310/60 R; 310/58; 310/62; 310/52; 310/89; 310/42; 416/5; 416/423.14

[58] Field of Search .................................. 310/62, 58, 59, 310/60 R, 52, 53, 54, 55, 89; 416/5, 93 R, 423.14

[56] References Cited

U.S. PATENT DOCUMENTS

| | | | |
|---|---|---|---|
| 2,488,365 | 11/1949 | Abbott et al. | 610/62 |
| 2,494,471 | 1/1950 | Claytor | 310/58 |
| 2,508,144 | 5/1950 | Carville | 171/252 |
| 2,516,184 | 7/1950 | Christie | 310/620 |
| 3,017,526 | 1/1962 | Luenberger | 310/60 R |
| 3,274,410 | 9/1966 | Boivie | 310/62 |
| 3,281,615 | 10/1966 | Cohen et al. | 310/59 |
| 3,610,976 | 10/1971 | Wightman | 310/60 |
| 3,900,234 | 8/1975 | Roddy et al. | 310/90 |
| 4,057,370 | 11/1977 | Numata et al. | 417/366 |
| 4,065,233 | 12/1977 | Torigoe et al. | 417/368 |
| 4,073,598 | 2/1978 | Mizutani et al. | 416/5 |
| 4,186,317 | 1/1980 | Sisk | 310/60 R |

(List continued on next page.)

FOREIGN PATENT DOCUMENTS

| | | | |
|---|---|---|---|
| 178334 | 7/1935 | Switzerland | 310/62 |
| 1 275 334 | 5/1972 | United Kingdom | H02K 5/06 |
| 2 073 958 | 10/1981 | United Kingdom | H02K 7/08 |
| 2 114 818 | 8/1983 | United Kingdom | H02K 1/28 |

OTHER PUBLICATIONS

Patent Abstracts of Japan vol. 14, No. 198 (M–0965), 23 Apr. 1990 & JP 02 040098 A (Matsushita Seiko), 8 Feb. 1990, *abstract*.

Patent Abstracts of Japan vol. 12, No. 378 (M–751), 11 Oct. 1988 & JP 63 129192 A (Matsushita Seiko), 1 Jun. 1988 *abstract*.

Patent Abstracts of Japan vol. 10, No. 295 (M–523), 7 Oct. 1986 & JP 60 108890 A (Matsushita Seiko), 27 May 1986, *abstract*.

*Primary Examiner*—Nestor Ramirez
*Assistant Examiner*—B. Mullins
*Attorney, Agent, or Firm*—Baker, Donelson, Bearman & Caldwell

[57] ABSTRACT

Ceiling fan motors which include forced air ventilation and heat dissipation systems to provide significantly reduced motor operating temperatures, improved motor component tolerances, lower manufacturing costs, and ease of assembly. The ceiling fan motor is of the inside-out type and includes an impeller mechanism associated with at least one of the upper or lower portions of the motor casing for drawing substantial volumes of air into the casing, across the stator, and through the opposite portion of the motor casing. The motor casing components may be formed from cast aluminum. Alternatively, the entire casing and rotor is of unitary integrally cast aluminum. One of the end faces of the motor casing may include integrally cast blade ramps.

35 Claims, 11 Drawing Sheets

U.S. PATENT DOCUMENTS

| | | | |
|---|---|---|---|
| 4,186,319 | 1/1980 | Dochterman | 310/89 |
| 4,210,835 | 7/1980 | Neveux | 310/62 |
| 4,250,417 | 2/1981 | Arnold | 310/62 |
| 4,391,570 | 7/1983 | Stutzman | 417/353 |
| 4,465,948 | 8/1984 | Oyama et al. | 310/62 |
| 4,471,250 | 9/1984 | Snider | 310/67 R |
| 4,508,958 | 4/1985 | Kan et al. | 219/369 |
| 4,536,672 | 8/1985 | Kanayama et al. | 310/268 |
| 4,669,952 | 6/1987 | Forsyth et al. | 415/119 |
| 4,689,507 | 8/1987 | Baker et al. | 310/62 |
| 4,692,096 | 9/1987 | Yang | 416/170 R |
| 4,720,648 | 1/1988 | DeVries et al. | 310/89 |
| 4,742,257 | 5/1988 | Carpenter | 310/62 |
| 4,862,581 | 9/1989 | Royer | 29/596 |
| 4,883,408 | 11/1989 | Borcherding | 416/93 R |
| 4,904,891 | 2/1990 | Baker et al. | 310/62 |
| 4,908,538 | 3/1990 | Geberth, Jr. | 310/59 |
| 4,961,016 | 10/1990 | Peng et al. | 310/62 |
| 5,021,696 | 6/1991 | Nelson | 310/62 |
| 5,069,601 | 12/1991 | Shawcross | 417/360 |
| 5,194,770 | 3/1993 | Yoshioka et al. | 310/51 |
| 5,222,864 | 6/1993 | Pearce | 416/5 |
| 5,296,769 | 3/1994 | Havens et al. | 310/90 |
| 5,311,089 | 5/1994 | Stroetgen et al. | 310/50 |
| 5,462,412 | 10/1995 | Scofield et al. | 416/210 R |
| 5,489,191 | 2/1996 | Tai | 416/210 R |

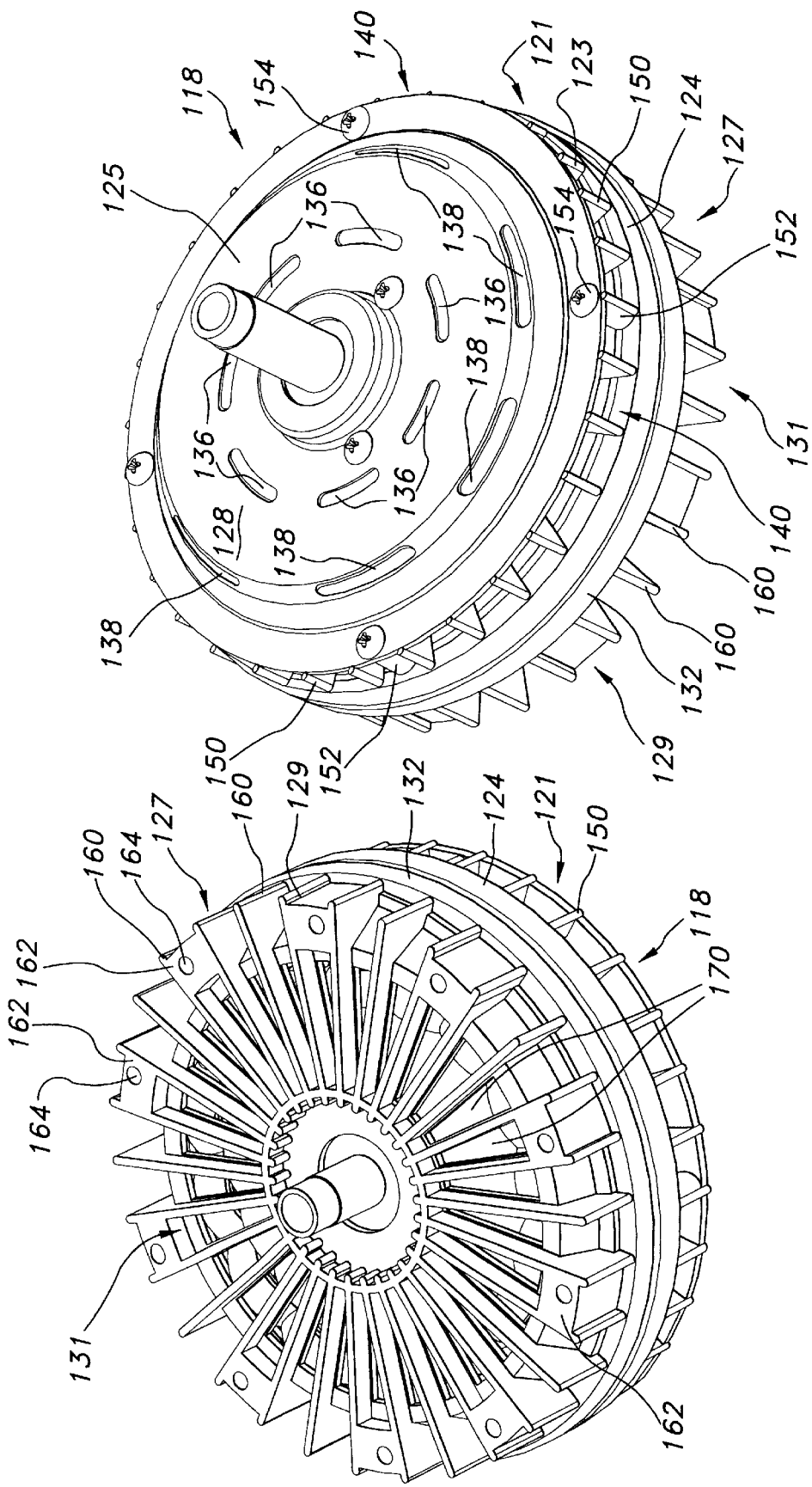

CEILING FAN MOTORS

BACKGROUND OF THE INVENTION

1. Field of the Invention

The invention relates generally to ceiling fans and ceiling fan motors. More particularly, the present invention relates to ceiling fan motors which operate under significantly reduced temperatures through the use of forced air ventilation arrangements that enable air to be forced through the motor casing, and through the use of conductive and convective heat dissipation arrangements to enable improved heat transfer through the motor components. The present invention also relates to an integrally cast ceiling fan motor preferably of cast aluminum, enabling tighter motor component tolerances, lower manufacturing costs, and easier assembly.

2. Description of Related Art

Electric motors are widely used in a variety of consumer products. One common type of electric motor includes a rotor which is attached to a shaft mounted within the end covers of a motor casing. The rotor typically is made of a stack of electrical steel lamination and may be die cast or wound, depending upon the type of motor. Bearings, such as ball bearings or sleeve bearings located at opposite ends of the shaft, are held in place within the end covers by stationary bearing retainers which are fixed to the end covers to enable the rotor and rotor shaft to rotate with respect to the casing of the motor. Surrounding the rotor is a stator where the windings of the motor are located. The stator is normally a stack of electrical steel lamination. As is well known, the rotor is oriented centrally within the stator and rotates with respect to the stator.

In another type of motor, generally known as an inside-out motor, the location of the rotor and stator are reversed. That is, the rotor is positioned outside of the stator and is sandwiched between, and attached to, two end covers that define the motor casing. Bearing retainers also are provided for the inside-out motor and are secured to the top and bottom end covers to rotate therewith.

A problem common to electric motors in general is the heat build-up that takes place during routine motor operation. High temperature heat build-up is a well-known undesirable resultant in electric motor operation and considerable efforts have been undertaken over the years to try to reduce the motor operating temperatures by cooling the motor during motor operation.

In electric motors of the type where the rotor lies within the stator, internal fan or impeller arrangements have been provided in an attempt to cool the stator windings and to pump the heat out of the motor. The fan may include blades mounted on the shaft of the rotor itself, within the motor casing. The fan may include fin-like blades molded directly to the rotor end rings whereby rotor shaft rotation rotates the blades to provide a fan-like effect during motor operation.

In the case of an inside-out motor, providing a cooling fan of the types described above for conventional motors has not been practical. Because the shaft of the motor, which is mounted to the stator, does not rotate, obviously any fan blades mounted on the shaft will not rotate and the cooling effect will be unavailable. Providing fins or blades on the surrounding rotor has proven to be of little help in increasing air circulation inside the motor, i.e., to the motor windings on the stator, because the rotor is outside of the stator.

Electric motors of the inside-out type are commonly used in electric ceiling fans. Most modern ceiling fans include an inside-out electric motor suspended from the ceiling through the stator shaft. The motor casing, which typically is formed from upper and lower end covers, or end bells, to which the rotor is affixed, rotates about the stator. A plurality of ceiling fan blades are mounted to either the top or bottom surface of the motor casing by means of blade irons, as shown in U.S. Pat. No. 5,462,412, or through the use of separate blade ramp components such as those disclosed in U.S. Pat. No. 5,222,864. Conventional ceiling fans also generally are provided with one or more electrical switches for controlling both the speed and the rotational direction of the motor. The electrical switches are typically located within a switch housing that is disposed beneath the motor. Additionally, many ceiling fans include light fixtures mounted to the underside of the switch housing. The overall motor casing is typically covered by a motor housing or cover for aesthetic purposes.

Electric motor heat build-up poses a particular problem within ceiling fans. Prior attempts to cool the stator windings and the rotor in inside-out motors within ceiling fans include providing ventilation holes within the motor casing end covers to improve the circulation of air within the motor casing. However, in reality, very little air circulation takes place because the presence of the stator itself forms an obstruction in the air flow paths. Ventilation holes also have been provided in the stator to provide a path for the cross-flow of air between the ventilation holes within the motor casing end covers, but the air flow is generally inadequate due to a number of factors that are unique to the ceiling fan motor environment.

For example, a ceiling fan motor and motor casing are typically surrounded by an outer motor housing. The motor housing forms a shield around the motor which obstructs the flow of air into the ventilation holes provided in the motor casing and around and through the motor itself. In addition, inadequate air flow results from the very nature of the ceiling fan blade design. The circulation of air in a room is caused by rotation of the fan blades. Since the circulation of air takes place at the tips of the blades, a void is created in the center of the fan which restricts the flow of air in the center region precisely where the motor housing is mounted.

The high heat build-up within the electric motors used in ceiling fans may significantly reduce the life of the motor and undesirably affect motor performance. Thus, there is a clear need for an electric motor of the inside-out type for use with ceiling fans which has substantially reduced operating temperatures to extend the operating life of the motor and enable a more powerful motor design.

Another problem typically encountered in ceiling fan motors is the imperfect alignment among the various motor components which results not only in increased wear but in undesirable noise and vibration levels. Electric motors of the type used in ceiling fans include several separate and distinct motor components that are assembled together through conventional screws or bolt and nut arrangements. These motor components include a separate rotor which is secured to the separate upper and lower motor casing end covers. Each of these components must precisely fit together, and with respect to the stator, at relatively close tolerances. However, manufacture of these components typically requires separate machining operations on separate components which then need to be assembled together. The separate machining operations limit the ability to achieve the desirable tight tolerances. Moreover, the manufacturing and assembly costs may be substantial. Thus, there is a need for an electric motor for a ceiling fan, particularly an inside-out electric motor for a ceiling fan, that may be easily and economically manufactured to tight tolerances to provide reduced vibrations and noise and a longer motor life.

Another problem in conventional ceiling fan designs is the assembly of the ceiling fan blades to the motor casing. Because the fan blades are relatively large in size, and because ceiling fans are adapted for use with several different types of fan blade arrangements, the mounting of the blades to the ceiling fan motor is typically accomplished by the retailer or sometimes even the consumer. This blade mounting requires the assembly of either blade irons or separate blade ramps to the ceiling fan motor casing. These steps in mounting the blade irons and/or the blade ramps to the motor casing are time consuming and expensive. Thus, a need has arisen to enable the mounting of fan blades to ceiling fan motor casings without the use of separate blade ramp and/or blade iron attachment components.

SUMMARY OF THE INVENTION

The present invention includes several unique embodiments to solve the above-mentioned problems associated with conventional inside-out ceiling fan motors. The present invention includes a forced air ventilation system that enables sufficient high air flows into the motor casing, across the stator and its windings, and exiting out through the motor casing at a location opposite to where the air initially entered. One embodiment of the present invention, which is well-suited for application to otherwise conventionally designed inside-out ceiling fan motors, provides for an impeller (or fan blade arrangement) mounted directly within the motor casing, preferably to one of the bearing retaining covers. The impeller creates a low pressure condition on one side of the stator to cause relatively large quantities of air to flow from outside of the casing, across the stator, and exit through air passageways or openings disposed circumferentially about the motor casing. The internal impeller includes impeller blades which may be affixed to the motor casing end cover, or end bell, either directly or through the bearing retaining cover plate that is itself attached to the casing end cover about the stator shaft. The impeller, preferably a centrifugal vane impeller, rotates with the motor casing to suck or draw air through openings within, for example, the bottom casing end cover, across the stator, and then radially outwardly through circumferentially located openings or air passageways in the upper casing end cover. The impeller may also draw air inwardly through openings in a top cover plate of the motor upper casing for assisting the cooling in the upper regions of the motor, above the stator. The impeller may similarly be associated with the bottom casing end cover which would then include circumferentially disposed openings in the lower casing periphery, so that air can be drawn from the upper casing top plate area, in a direction substantially parallel to the axis of the motor shaft, across the stator, and then radially outward through the circumferential openings. Still further, the impeller blades may be designed so as to push air across the stator, i.e. from a high pressure side of the motor casing, through the stator, into the low pressure side. In such instance, a centrifugal vane impeller would draw air radially inward, from air openings that are disposed about the circumference or periphery of the motor casing, and then would push the air across the stator, substantially parallel to the axis of the stator shaft, to the opposite side of the casing and outwardly through the end plate or end region of the motor casing. Still further, the impeller arrangements can be designed so that both the upper and lower motor casing portions may include impellers preferably mounted to bearing retaining plate covers within each of the top and bottom motor casing portions, such that one impeller draws air through openings in the motor casing on the opposite side of the stator, draws the air across the stator, and then radially outward, whereas the other impeller pushes air received radially, across the stator, and then radially outward in conjunction with the first impeller's air flow path. That is, each impeller, mounted to upper and lower casing portions, may be configured so that the air flow reinforces each other.

The present invention is further directed to a forced air ventilation system where at least one of the upper and lower motor casing portions, preferably the motor casing portion having the circumferentially disposed openings in the casing sidewall, is formed from a material having high thermal conductivity so as to enable heat dissipation by conduction and convection. Such a material, preferably cast aluminum, enables the inclusion of a plurality of fins of various geometric configurations to be integrally cast within the circumferentially disposed openings to maximize the overall surface area to volume ratio of the casing and to enable heat to be dissipated by conduction through the fins and then by convection from the fins to the adjacent atmosphere. The opposite motor casing portion may also be of cast aluminum to maximize the heat transfer characteristics.

The present invention further includes integrally formed blade ramps cast directly with the top and/or bottom faces of the motor casing. The motor blade ramps may be configured as fins or air scoops to assist in heat dissipation and air flow.

The present invention further relates to an integrally cast motor, preferably of cast aluminum, that integrates the upper and lower motor casing portions with the rotor. Specifically, the sidewall and top end face of an upper portion of the motor casing, the sidewall and bottom end face of a lower portion of the motor casing, and the rotor are all cast together. As a result of this unitary casting, subsequent machining is more accurate and less costly. For example, the bearing bore within the bottom of the lower casing portion and the internal circumferential wall of the rotor can be machined together thus enabling a true orientation of each of these machined faces with respect to each other. That is, the bottom bearing bore circumference and the internal circumference of the rotor wall will be precisely aligned to enable precise concentricity and rotatability of the rotor with respect to the stator. Moreover, the integrally cast assembly reduces costs by avoiding the connection of separate upper and lower motor casing components to a separate rotor by screws or bolt and nut arrangements, resulting in fewer assembly steps, and less potential for the components to vibrate. The integrally cast casing and rotor can be further integrated with cast blade ramps for mounting the fan blades, thus further reducing components and assembly steps.

The integral casting is particularly well-suited for incorporating the forced air ventilation system and the advantageous heat dissipation geometric arrangements. The integral casting enables various geometric fin designs having optimum surface area to volume ratios to be easily configured within the circumferential or peripheral openings of the motor casing. Moreover, separate fin arrangements may be integrally cast with the top and bottom faces of the motor casing to increase the overall surface area, thus maximizing the surface-to-volume ratio for enhanced heat transfer. Still further, the integrally cast top and/or bottom fin arrangements can be configured as air foils to guide air movement and thus improve air flows between the interior and exterior of the motor casing.

Thus, it is an object of the present invention to reduce high temperature heat build-up within a ceiling fan motor particularly of the inside-out type by providing a forced air ventilation system that draws and flushes air through the motor casing and across the stator. It is a further object of the present invention to reduce heat buildup by forming one or more motor casing components of cast aluminum to improve conductive and convective heat transfer through the casing and then to the outside environment. Yet another object of the present invention is to provide a forced air ventilation system with cast aluminum motor casings having fin arrangements that maximize the surface-to-volume ratio of the casing thus improving the heat transfer characteristics.

Still further, it is an object of the present invention to have a unitary, integrally cast motor casing and rotor, preferably of cast aluminum, to enable tighter tolerances resulting from fewer separate components and from single step machining of the critical motor components such as the bearing and rotor surfaces, thus enabling superior alignment between the rotor and stator and in turn resulting in lower noise and longer life. The unitary integral casting is of lower cost and can be cast with fin arrangements on the upper and lower casing portions configured to enable a pitched blade attachment, thus avoiding the need for separate blade ramps, and resulting in fewer assembly steps.

These and other objects of the present invention will be further apparent when reference is made to the accompanying detailed description and drawings.

BRIEF DESCRIPTION OF THE DRAWINGS

FIG. 4 is a top perspective view of an alternative embodiment of the present invention having cast motor casing components.

FIG. 5 is a bottom perspective view of the embodiment of FIG. 4.

DESCRIPTION OF THE PREFERRED EMBODIMENTS

Figure 1:
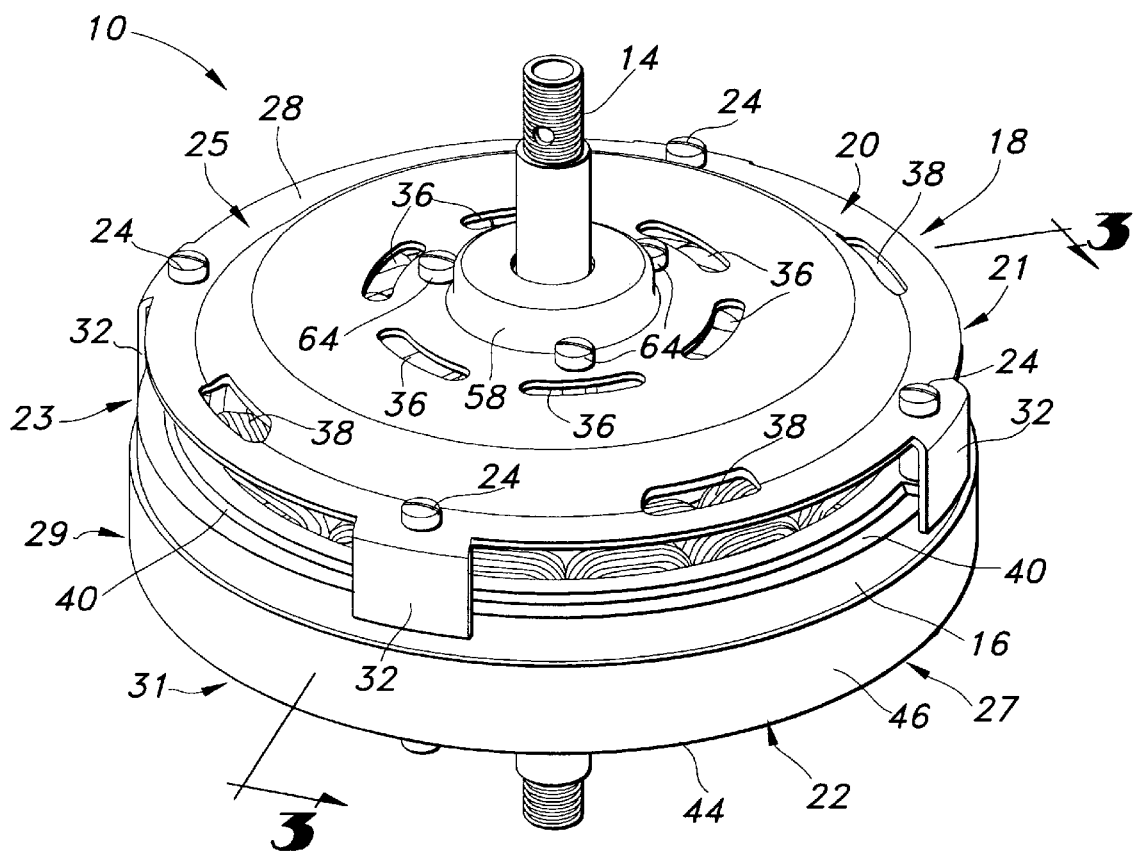
FIG. 1 is a perspective view of one embodiment of an inside-out ceiling fan motor.
Figure 2:
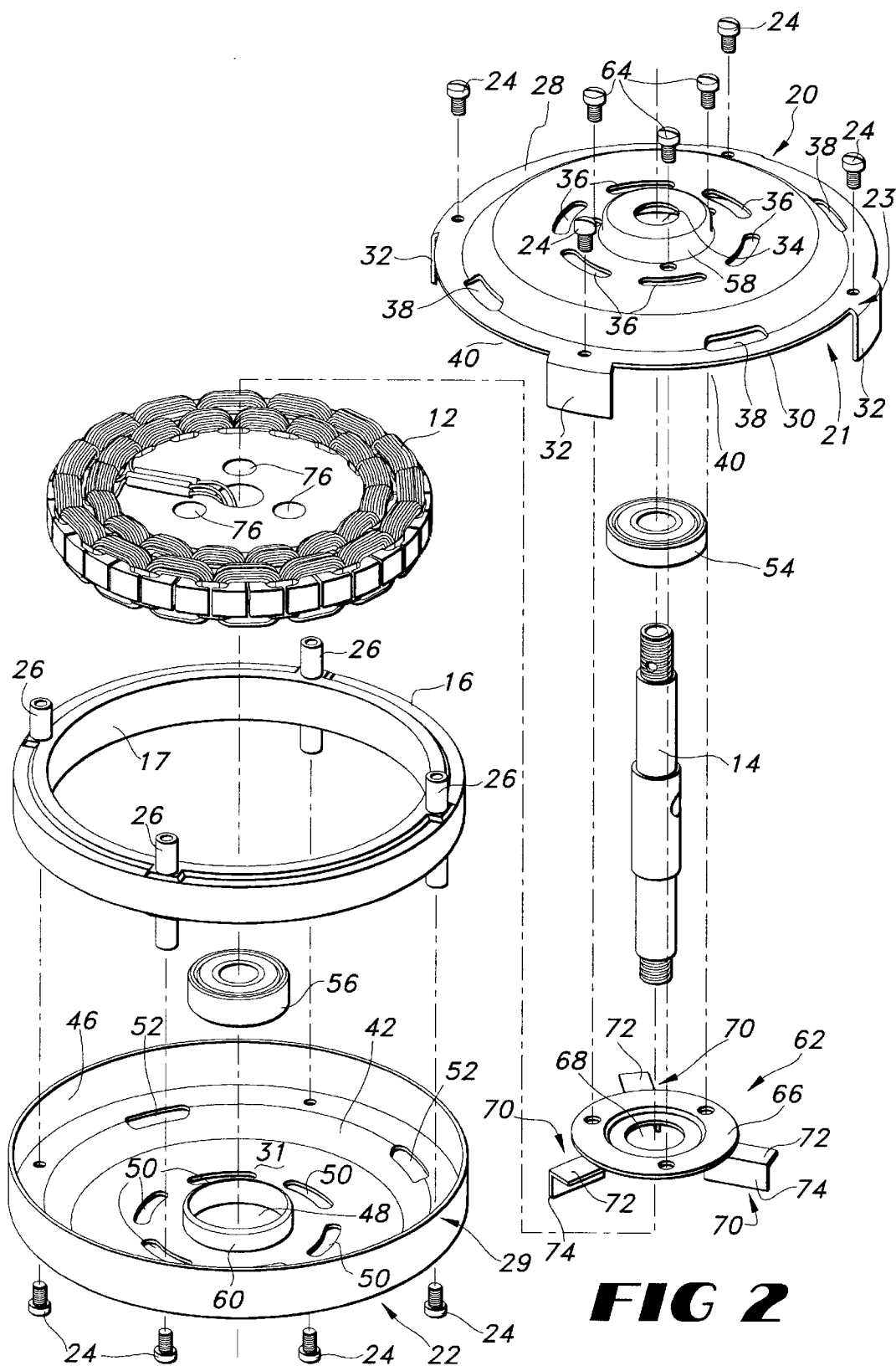
FIG. 2 is an exploded view of the ceiling fan motor of FIG. 1.
Figure 3:
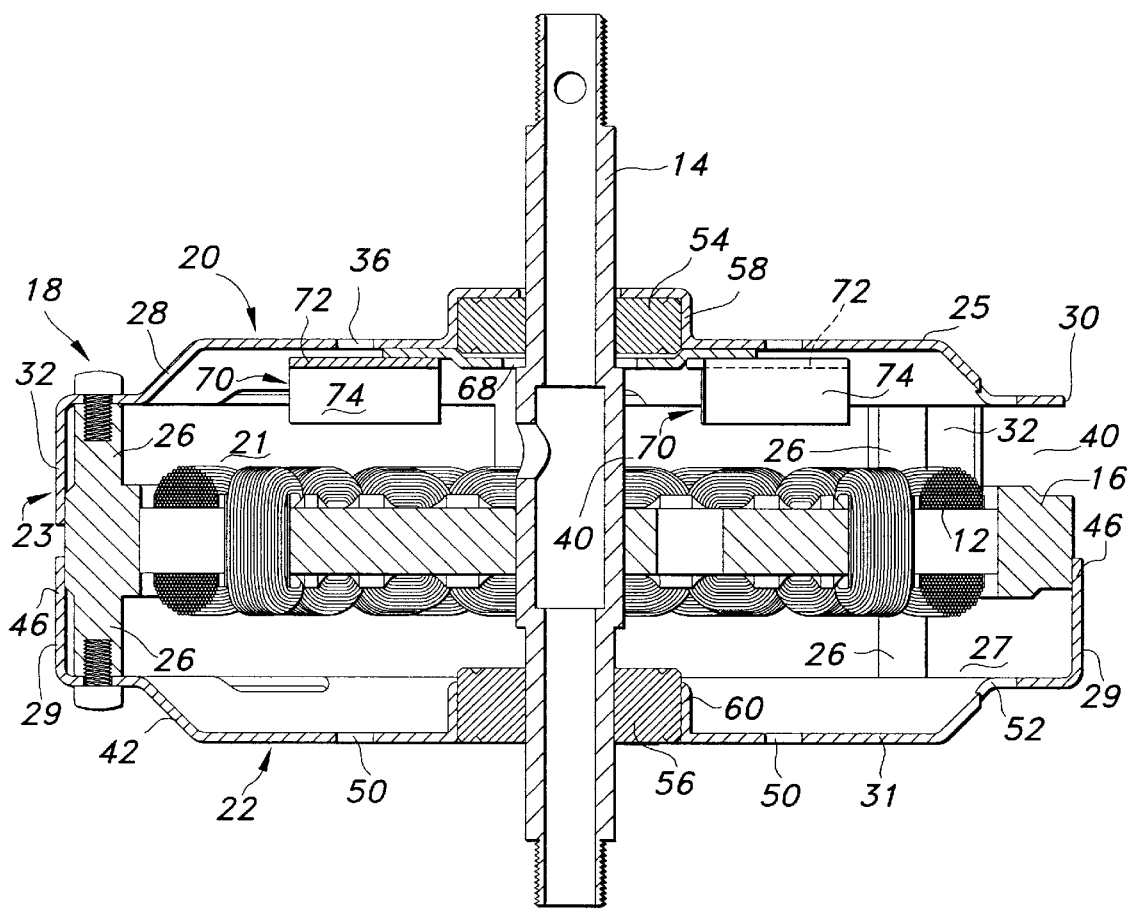
FIG. 3 is a sectional view of the ceiling fan motor of FIG. 1 taken along line 3—3 of FIG. 1.

Referring now in more detail to the drawings, in which like numerals indicate like parts throughout the several views, FIGS. 1–3 disclose generally a first embodiment of the inside-out ceiling fan motor which employs an internal air forcing arrangement for cooling the internal components of the motor during its operation. In this embodiment, the ceiling fan motor 10 is formed from separate "inside-out" a.c. motor components that are interconnected in a generally conventional manner. The motor 10 includes a centrally disposed stator 12 fixedly mounted on a stationary stator shaft 14. The stator 12 as is well known, is typically formed from a stack of electrical steel laminations and includes the motor windings. An annular rotor 16 having an inner cylindrically-shaped wall 17 is concentrically positioned about the stator 12. The rotor 16, as is well-known, is formed from a stack of electrical steel laminations. During operation, rotor 16 will rotate about stator 12 and its stator shaft 14.

The ceiling fan motor 10 includes a two-piece motor casing 18 comprising upper 20 and lower 22 end covers or bells. End covers 20 and 22 are affixed by any suitable means, such as screws 24, to a plurality of vertically extending pegs 26 included on rotor 16 in order to provide concomitant rotation of the casing 18 with rotor 16 and about stator 12 and shaft 14 during motor operation. Upper end cover 20 includes a generally circular disk shaped top portion, or top plate, 28 having an outer rim 30 and a downwardly extending arcuate side wall 32 integrally formed with the top portion 28. The top portion 28 has a centrally located hole 34 for receiving shaft 14 and a first set of ventilation openings (holes) or air flow passageways 36 positioned about hole 34 in close proximity to the hole 34. A second set of air flow passageways 38 may be annularly positioned on an outer periphery of top portion 28. The precise configuration and location of the air flow passageways may vary so long as they are sufficient in number, shape, and location to enable the desired air flow into the motor casing 18, as will be described.

The upper 20 and lower 22 end covers then define an upper casing portion 21 having a substantially cylindrical upper side wall region 23 and a top end face region 25, and a lower casing portion 27 having a substantially cylindrical lower side wall region 29 and a bottom end face region 31. The upper side wall region 23 includes the arcuate side walls 32 that are depicted as tabs integral with the top plate 28. However, these side walls may be connected with the rotor 16 or integral with the pegs 26, in which case the side walls will be secured to the top plate 28 by screws or other suitable attachment.

The motor casing 18 components, i.e. the upper and lower casing portions 21, 27, may be formed from stamped sheet steel as is well known in the art. Alternatively, and in accordance with another novel embodiment of the present invention to be described in greater detail below, the casing components can be made of materials having a high thermal conductivity, such as aluminum, to dissipate the heat that is generated during the motor operation.

The upper side wall region 23 includes the arcuate side wall 32 which extends about an upper portion of the outer periphery of rotor 16. As depicted in FIGS. 1 and 2, upper side wall 32 includes a plurality of circumferential or arcuate openings 40 that form air passageways within side wall region 23, as will be described. The size of the openings 40 are depicted sufficiently large to allow considerable air flow to cool the motor, i.e. substantially the entire upper side wall region 23 is open and only a relatively small portion of the side wall circumference includes the downwardly extending tab portions 32 which extend over rotor 16.

Substantial variation in the configuration or geometry of the upper casing portion 21 is possible, particularly in those embodiments where the upper casing portion 21 is made of highly thermally conductive material to dissipate heat build-up. In such instances, the upper casing portion 21 should have a high surface to volume ratio to maximize the heat transfer, as will be discussed. For example, the openings 40 may include a plurality of fins, such as partitions extending from the top portion 28 to the rotor 16 top face and extending radially inward from the outer circumferential region. The fins may be disposed perpendicularly to the top plate 28. Alternatively, the fins may be arcuate and disposed parallel to the top plate. Still further, a combination of both parallel and perpendicular fins may be constructed. The openings 40 may be filled with a grate-type geometry. Even in those embodiments where highly thermally conductive materials are not utilized, fins or grates may be employed within the openings 40. Other arrangements, such as a plurality of thin rods that are spaced equidistantly about the upper side wall region 23 are also possible. The precise geometry is not intended to be limited so long as the overall goals of the side wall region are met, such as to enable sufficient air flow to cool the motor (in a manner to be described), to optimally dissipate heat by conduction and convection (to be described) and, of course, to provide adequate support for maintaining the top plate 28 in position with respect to the top of the rotor 16.

The lower end cover 22 includes a generally circular disk shaped bottom portion or plate 42 having an outer rim 44 and an upwardly extending arcuate or cylindrical side wall 46. Bottom plate 42 has a centrally located hole 48 for receiving shaft 14 and a first set of ventilation openings (holes) or air flow passageways 50 annularly positioned about hole 48 in close proximity thereto. A second set of ventilation openings or airflow passageways 52 may be annularly positioned near an outer periphery of bottom plate 42. The upwardly extending annular side wall 46 extends over and surrounds a lower portion of the outer periphery of rotor 16. As with the upper plate 28, the number, shape, and location of the air flow passageways 50, 52 may be adjusted to meet the air flow goals as will be described.

In order to axially secure the stator 12 and the shaft 14 within the motor casing 18, the shaft 14 is journaled in top 54 and bottom 56 bearings which are centrally positioned within the top 20 and bottom 22 end covers, respectively. The top bearing 54 is secured within a bearing bore 58 defined by top end cover 20 which is annularly positioned about hole 34. The bottom bearing 56 is press fit into a centrally disposed upwardly extending annular side wall or bore 60 defined by the bottom end cover 22, which is annularly positioned about hole 48. The bottom end cover 22 may include an annular rim about the hole 48 to enable the bottom bearing 56 to be further supported. This rim (not shown) and the side wall 60 forms a bearing bore.

An internal impeller (or fan) 62 is attached by any suitable means, such as screws 64, to an interior surface of top plate 28 for forcing air through the motor housing 18 and over and across the internal components of the a.c. motor during operation, as will be described. The impeller 62 also may serve to retain the top bearing 54 within the bearing housing 58. That is, impeller 62 includes a top bearing plate or retainer 66 having a centrally disposed hole 68 through which the shaft 14 extends. A plurality of impeller blades 70 are attached to the bearing plate 66 and extend radially from the shaft 14. The impeller blades 70 include a horizontally disposed portion 72 attached to the bearing retainer plate 66, and a vertically disposed portion 74 which is attached to portion 72 and extends downwardly from the plate 66. The blade portions 72 and 74 define a generally "L" shaped cross-section and the three blades 70 are equidistantly positioned about the outer periphery of the retainer plate 66.

The impeller 62 is configured as a centrifugal impeller. In operation, the rotation of the rotor 16 and the attached motor casing 18 and impeller 62 forces ambient air through the bottom air flow passageways 50, 52 into the motor casing 18, and across the stator 12 through stator openings 76, as well as through the stator windings, and upwardly in a direction generally parallel to the stator shaft 14, and then radially outward through the upper side wall air flow passageways 40. That is, air is drawn or sucked upwardly into the lower casing portion 27, across the stator and stator windings, into the upper casing portion 21. The air then is forced at generally right angles through the upper sidewall airflow passageways 40. This air movement results from a low pressure condition formed by the rotation of the centrifugal impeller blade which draws air into the motor casing. The low pressure condition created in the upper casing portion 21 also draws air into the casing through the airflow passageways 36, 38 within the top end face region 25, which assists in cooling the upper portion 21 of the casing.

The air flow volume and rate can be varied depending upon the size and shape of the bottom air flow passageways 50, 52 as well as the geometry of the impeller blades. Although three impeller blades are shown, it should be apparent that the number of impeller blades can be increased. The geometry of the impeller blades can also be altered to perform the above-described air flow function. Various impeller blade designs may be utilized to perform the centrifugal impeller function.

The impeller need not be associated with the bearing retainer plate 66. That is, the bearing retainer plate 66 can be formed without any impeller blades, in which case the impeller blades 70 may be connected directly with, for example, the top plate 28, in a manner not shown. The impeller may be formed from tabs or segments punched out of the top plate 28 and bent downwardly into the interior of the casing to form a plurality of vanes that serve to draw air upwardly through the lower casing portion 27, across the stator, and then radially outward through the sidewall region of the upper casing portion 21. Similarly, more than one impeller may be associated with the upper portion of the casing to obtain desired air flow volumes and rates. For example, the bearing retainer plate 66 may include the impeller blades 70 as depicted, together with additional impeller blades which are associated with the top cover plate 28 to assist in obtaining the desired air flow volumes and rates.

The impeller design as shown in FIGS. 1–3 serves to draw air through the lower casing portion, across the stator and radially outward through the upper sidewall air flow passageways. However, the impeller can be designed and configured to instead draw air radially inward through the upper sidewall region air passageways 40 and then forced downward, generally axially, across the stator, and out through the bottom air flow passageways 50, 52 in the bottom end cover 22.

In the embodiments described above, the impeller is located in the upper casing portion 21. However, the impeller can instead be mounted in the lower casing portion 27, where it preferably would be integrated with a lower bearing plate (not shown) that overlies the lower bearing 56, or alternatively may be associated with the bottom end face region 31 in a manner similar to that described above with respect to the top plate 28. In such case, the lower casing portion 27 would include circumferential openings, similar to openings 40, disposed within the lower sidewall region 29, and the openings 36, 38 in the top plate would be configured and located to enable sufficient quantities of air to flow through the top plate and into the upper casing portion 21, across the stator, into the lower casing portion 27, then radially outward from the lower casing portion through circumferential openings which may be incorporated therein. Similarly, an impeller may be mounted in the bottom casing portion to draw air radially into the bottom casing portion through circumferential openings in the bottom casing portion, and then force the air across the stator in a substantially axial direction and outwardly through openings in the top plate 28 of the upper casing portion 21.

In yet another arrangement, not shown in the drawings, impellers are provided in both the upper casing portion 21 and the lower casing portion 27, where each of the upper and lower casing portions have circumferential openings defining sidewall air flow passageways. That is, with reference to FIGS. 1–3, the lower sidewall region 29 may be substantially identical to the upper sidewall region 23. A centrifugal impeller such as depicted in FIGS. 1–3 would be maintained in the upper casing portion, but an additional centrifugal impeller or fan would be associated with the bottom casing portion. The additional centrifugal impeller would draw air inwardly through the circumferential openings in the lower casing sidewall region 29 and push or force the air across the stator, to provide an added or enhanced airflow effect to the air drawn by the impeller in the upper portion 21 of the casing 18.

It should also be understood that impellers other than centrifugal impellers may be used in the motor of this present invention. For example, axial flow impellers, which move air entirely in axial directions, versus the 90° directions of the centrifugal impellers, may be positioned within and connected to one of the upper and lower casing portions. Such axial flow impellers would serve to draw air and to expel air only in a substantially axial direction. That is, air would be drawn through air flow passageways in one of the top or bottom end plates, across the stator, and would exit through the other of the top and bottom end plates. Such an axial impeller could be employed either in the upper portion or lower portion of the motor casing.

Figure 6:
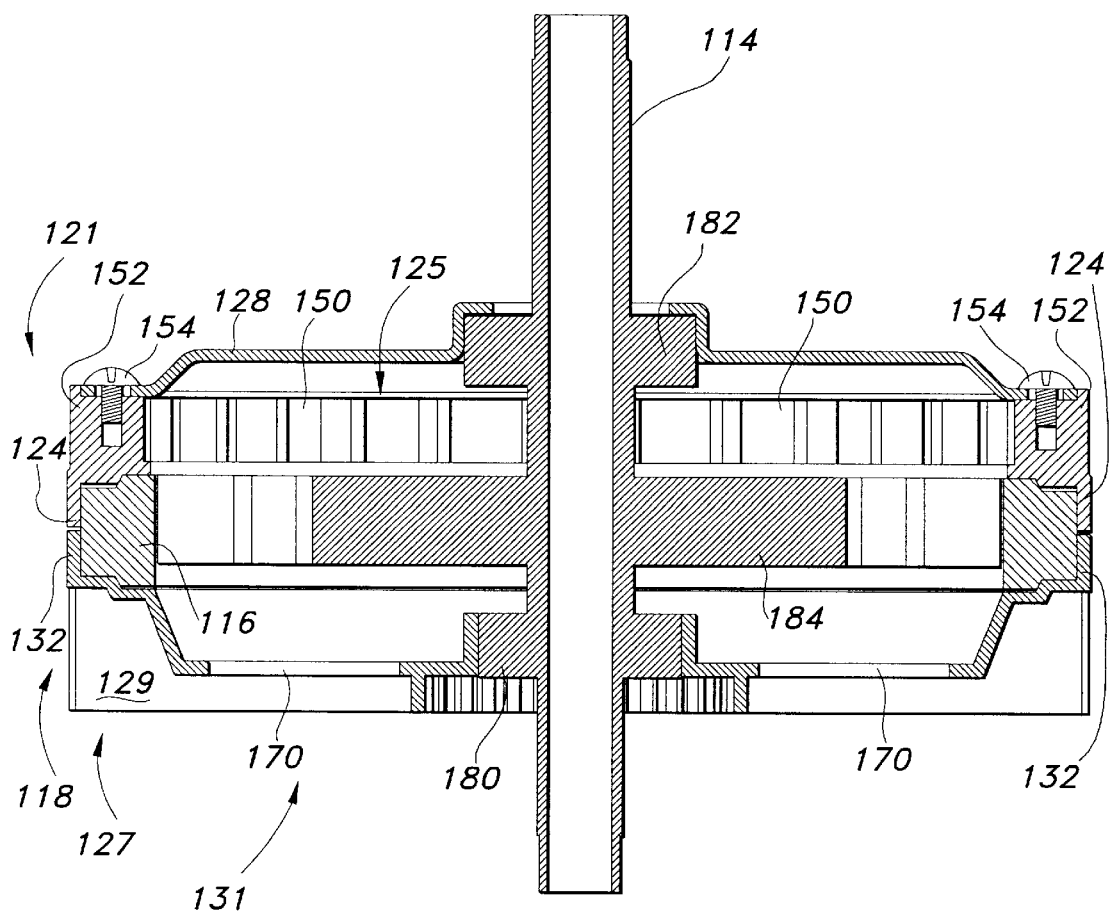
FIG. 6 is a cross-section along a diameter of the embodiment of FIGS. 4 and 5.
Figure 7:
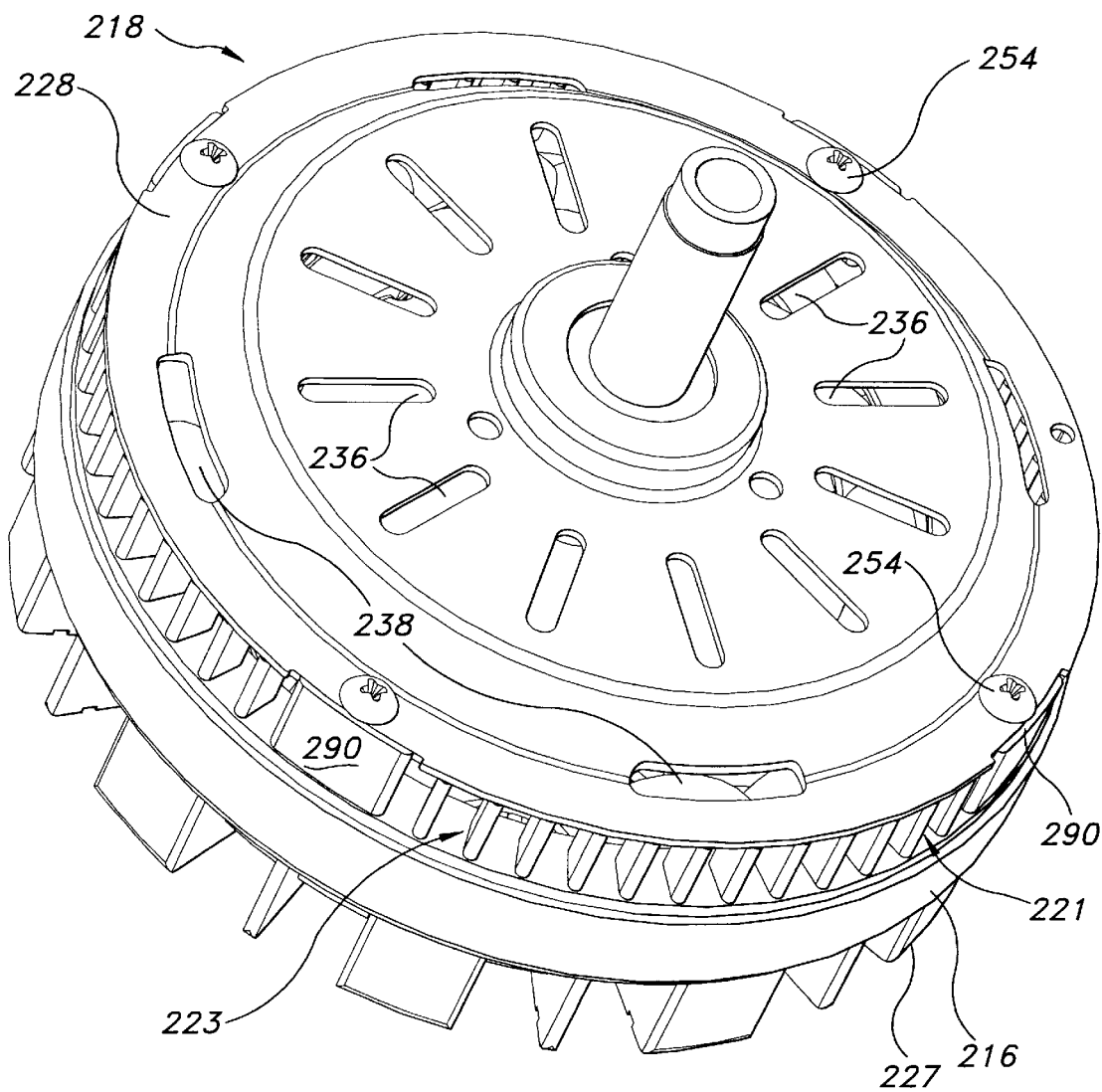
FIG. 7 is a top perspective view of another embodiment of the present invention having integrally cast upper and lower casing portions and an integrally cast rotor.
Figure 8:
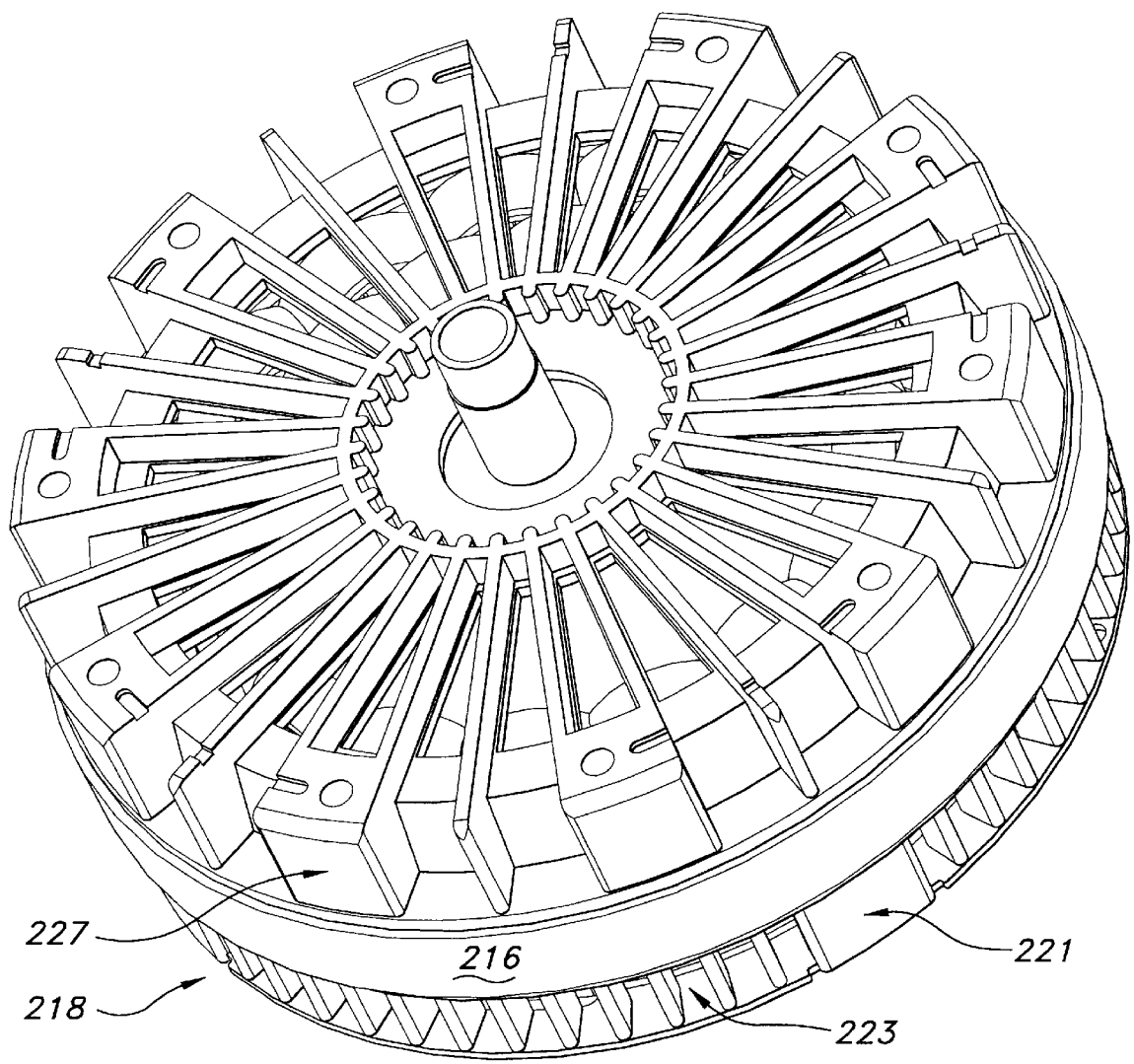
FIG. 8 is a bottom perspective view of the embodiment of FIG. 7.
Figure 9:
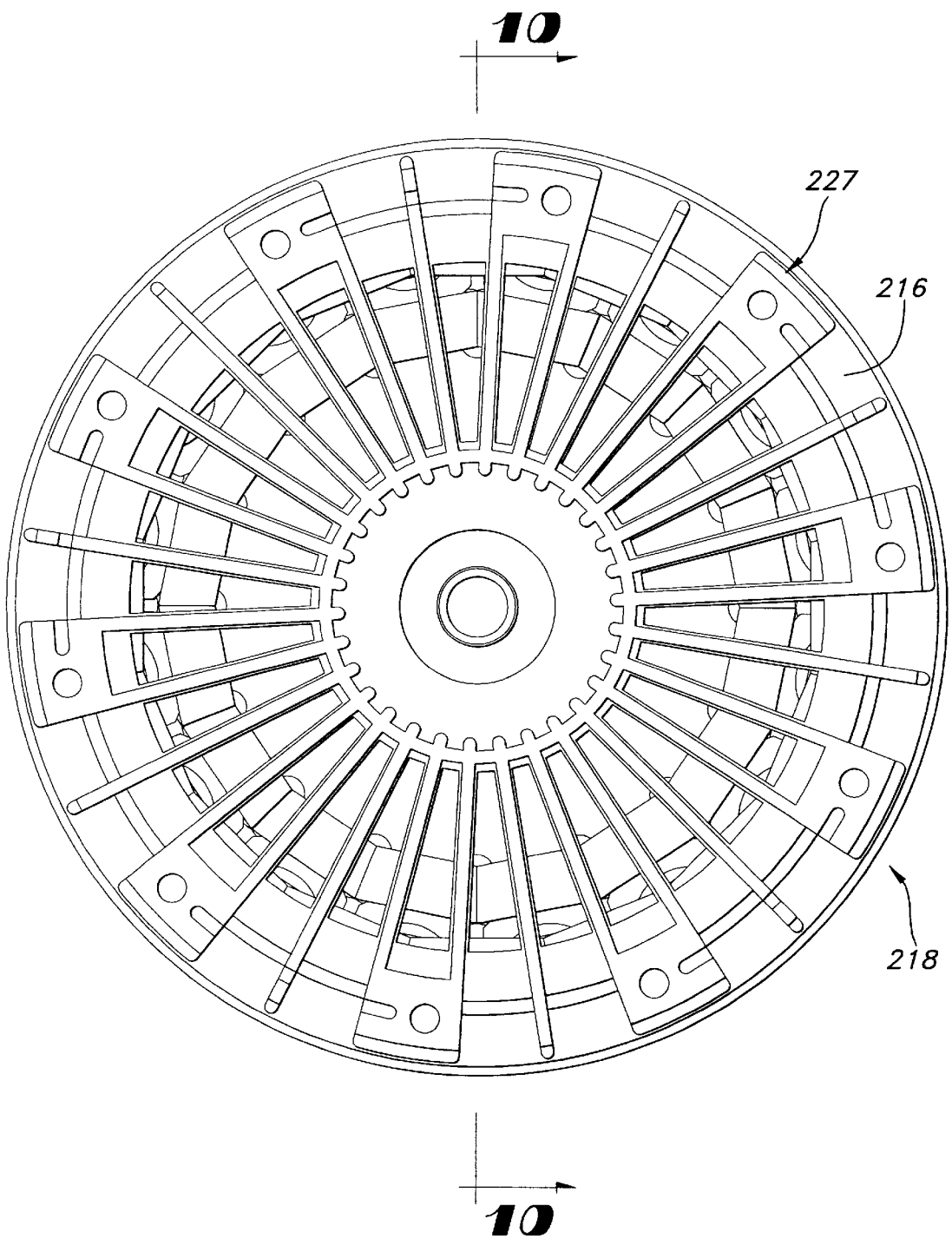
FIG. 9 is a bottom plan view of the embodiment of FIGS. 7 and 8.

FIGS. 4–6 depict an alternative embodiment of the present invention where the upper casing portion 121 and the lower casing portion 127 are each separately formed from a highly thermally conductive material, such as aluminum and preferably cast aluminum. The motor casing 118 includes an upper casing portion 121 having a substantially circumferential upper sidewall region 123 and a top end face region 125. The upper casing sidewall region 123 includes a plurality of radially disposed fins 150 integrally cast with the circumferential sidewall 124 that surrounds the upper portion of the rotor 116. A top cover plate 128 is positioned over the top end face region 125. The circumferential periphery of the top cover plate 128 is secured by any suitable means, such as screws 154, to the sidewalls via mounting blocks 152 integral with the sidewalls 124. The lower or bottom casing portion 127 includes a substantially circumferential lower sidewall region 129 and a bottom end face region 131 which are similarly formed from cast aluminum or other highly thermally conductive material. A plurality of radial fins 160 are integrally cast with, and extend from, the outer circumferential sidewall 132 of the lower sidewall region 129. A plurality of mounting faces or webs 162 are cast to interconnect various adjacent radial fins 160 and include holes or openings 164 for mounting ceiling fan blades, either with blade irons or separate blade ramps, each of which are well-known in the art. The bottom end face region 131 of the lower casing portion 127 includes a plurality of openings or bottom air flow passageways 170. The rotor 116 is fixedly secured to the upper and lower casing portions by suitable screws, bolts, or other fastening means, not shown.

FIG. 6 depicts only schematically the bearings 180 and 182, stator shaft 114, and stator laminations 184 (the stator windings are not shown). These components are substantially identical to those described with respect to FIGS. 1–3. Similarly, an air forcing mechanism, preferably a centrifugal impeller arrangement as described with respect to FIGS. 1–3 is incorporated within the casing substantially identical to the various impeller arrangements described with respect to FIGS. 1–3. For example, the upper bearing 182 is retained to the top cover plate 128 by a bearing retainer plate having impeller blades radially extending therefrom as described in the embodiment of FIGS. 1–3. The air flow movements into and out of the motor casing are substantially as described with respect to the FIGS. 1–3 embodiment.

The use of cast aluminum upper and lower casing components enables heat to be dissipated by conduction through the overall aluminum motor casing, particularly through the cast aluminum fins 150, 160 and then by convection from the aluminum motor casing and aluminum fins, to the ambient surrounding atmosphere. This provides a substantial improvement in heat dissipation, particularly when used in combination with the air forcing mechanism described above with respect to the embodiment of FIGS. 1–3.

As generally discussed above with respect to the embodiment shown in FIGS. 1–3, the arrangement and shape of the fins 150 may be varied considerably to achieve a cooling effect. The overall objective is to maximize the surface-to-volume ratio of the motor casing to increase heat dissipation by conductivity through the aluminum casing material and by convection from the casing material to the atmosphere. Of course, the surface area of the fins that define the sidewall air flow passageways 140 cannot be so great so as to obstruct air flow. Tradeoffs between maximizing air flow by reducing obstructions, and maximizing heat dissipation by increasing the fin surface area will inevitably be required and can be determined empirically.

Although the fins 150 are shown as radially straight in FIG. 4, it should be apparent that the fins 150 could be curved to form air scoops or air foils to assist in directing air between the exterior and interior of the motor casing. The design of the bottom casing portion 127 of end face region 131 also is dictated by the goal of maximizing the surface-to-volume ratio to optimize heat dissipation by conduction through the bottom casing and convection from the casing material to the surrounding atmosphere.

The ratio of the overall exterior surface area of the entire motor casing to the overall volume encompassed by the exterior of the entire motor casing may vary depending upon the power of the motor and the environment in which the ceiling fan is intended to be mounted. Surface-to-volume ratios which produce an optimum reduction in the motor operating temperatures can easily be determined empirically. It should be apparent that the overall surface area and volume measurements often are dictated by the available space requirements within the ceiling fan housing. Thus, the desired surface-to-volume ratios may be achieved by altering the fin design and the particular positioning or placement of the fins within the side walls and the top and/or bottom surfaces of the motor casing.

Although the embodiment of FIGS. 4–6 is intended to be utilized in combination with the air forcing mechanism, such as the impeller arrangements as described above with respect to the FIGS. 1–3, it should be apparent that the utilization of a ceiling fan motor casing, having separate upper and lower casing portions formed of cast aluminum, and having integrally formed cast aluminum fins to maximize the surface-to-volume ratio, has significant utility in improving the efficiency of the motor, even without the air forcing mechanism. The use of cast aluminum upper and lower casing portions results in improved heat dissipation.

Turning next to the embodiment of FIGS. 7–10, an integrally cast motor casing 218 is depicted wherein the casing comprises an integral upper casing portion 221, a lower casing portion 227 and a rotor 216 which are integrally cast together as a single unit. This integrally cast motor casing and rotor arrangement has substantial utility in heat dissipation to lower the operating temperature of the ceiling fan motor even in the absence of any air forcing mechanism disposed therein. Indeed, it has been observed that the temperature reductions for the depicted integrally cast motor, within a ceiling fan environment, may be substantially the same as the temperature reductions achieved by using the forced air mechanism of the embodiment depicted in FIGS. 1–3, depending upon the overall design of the motor.

The overall geometry of the upper 221 and lower 227 motor casing portions are substantially the same as that depicted in the separate component embodiment of FIGS. 4–6. The overall design parameters and goals are the same. The top cover plate 228 is not part of the unitary casting but is a separate stamped or cast plate, preferably cast aluminum, and includes holes or openings for screws 254 to be inserted within threaded mounting posts 252 which are integrally cast with the outer circumferential region of the upper casing portion 221 and cast to the top of the rotor 216. The top cover plate 228 includes perpendicularly extending tabs or sidewall portions 290 that form part of the upper casing sidewall region 223. The top cover plate 228 includes air flow passageways disposed both radially 236 and circumferentially 238, the circumferential passageways 23 being disposed radially outwardly from the radial passageways 236. As discussed above, the shape, location, and number of openings in the top cover plate 228 may be varied to achieve different air flow volumes and rates.

Figure 10:
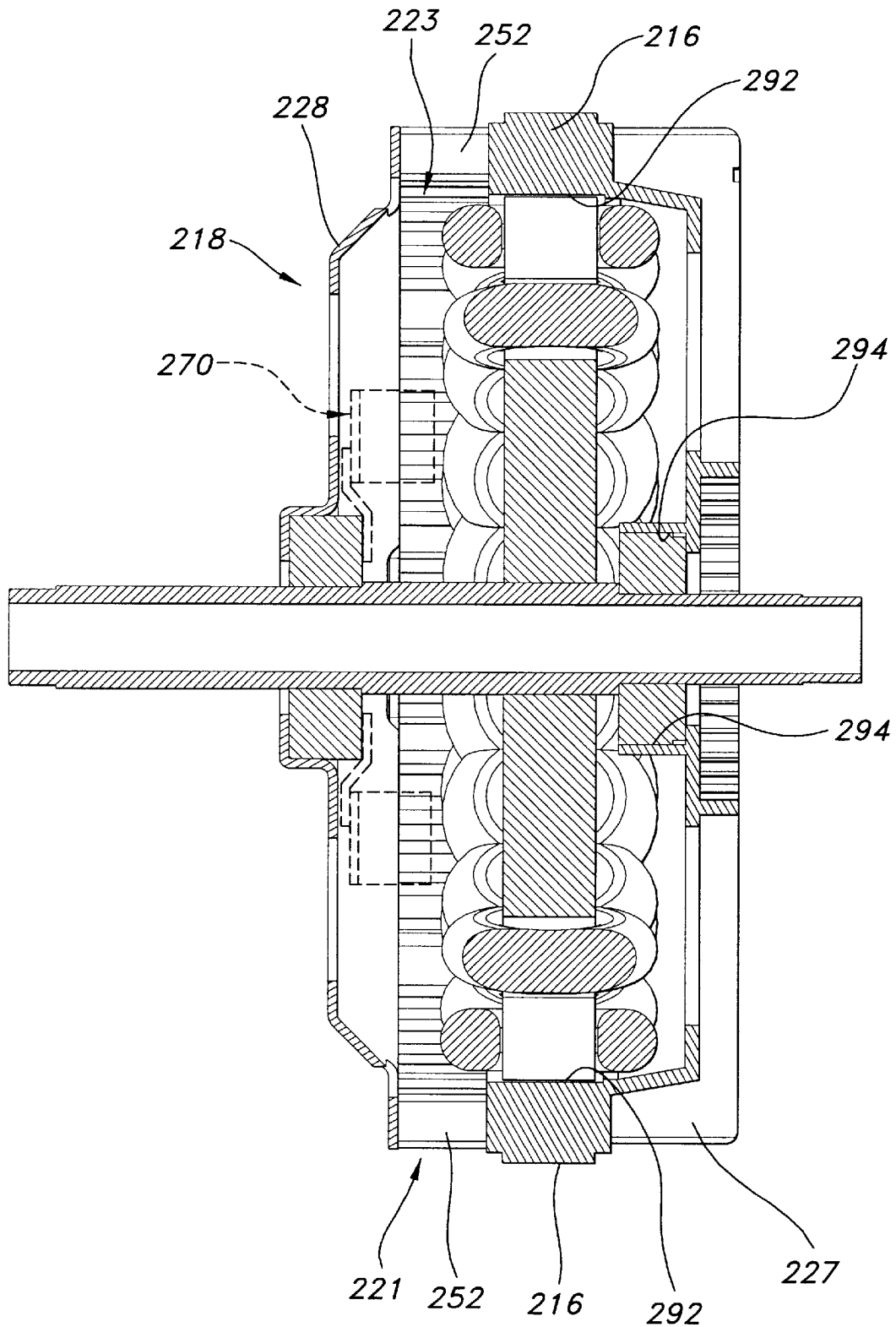
FIG. 10 is a cross-section along line 10—10 of FIG. 9.

As best shown in FIG. 10, the rotor 216 is integrally cast with the upper 221 and lower 227 casing portions. The rotor 216 is of electrical steel lamination and may be cast by inserting the steel lamination into the casting mold and then pouring the molten aluminum. This casting process is known as the insert molding or casting process and is well known in the casting art.

Following casting, the inner circumferential rotor wall 292 and at least the circumferential bottom bearing wall 294 may be machined simultaneously to provide an exact orientation of each of the walls with respect to the other. This precision provides accurate and close tolerances between the stator and the stator shaft, with respect to the rotor and motor casing, to significantly reduce vibrations and noises, and substantially prolong the life of the motor.

The integrally cast unitary casing and rotor embodiment of FIGS. 7–10 may be utilized without a forced air ventilation system, i.e. without the impeller arrangement of FIGS. 1–3, in which case cooling is accomplished by heat dissipation through conduction and convection. However, significant additional cooling can be obtained by incorporating the impeller arrangements as described above with respect to FIGS. 1–3. Shown in phantom in FIG. 10 is an impeller 270 affixed to a bearing retainer cover plate as described in the FIGS. 1–3 embodiment. The other impeller arrangements as described above may similarly be incorporated.

In the above-described embodiment of FIGS. 7–10, the top cover plate 228 is not integrally cast with the upper 221 and lower 227 motor casing portions and rotor 216. Instead, the top cover plate 228 is attached by screws or bolts to mounting posts integrally cast with the outer circumferential region of the upper casing portion 221, or with the rotor, to allow access to the interior of the motor casing 218 for insertion of the stator. However, as an alternative (not shown), the top plate 228 may be integrally cast with the upper casing portion 221 and rotor 216. In this alternative embodiment, the lower casing portion 227 may be a separate bottom cover that is affixed to the integrally cast rotor/upper casing/top cover structure by screws or bolts which are inserted in suitable mounting posts or holes provided within the rotor face. That is, the lower casing portion may be a separate cover structure, similar to the separately cast lower casing portion 127 in the embodiment of FIGS. 4–6, and affixed to the cast rotor by screws or bolts. This lower cover could be a separately cast component or may be formed from stamped steel.

Figure 11:
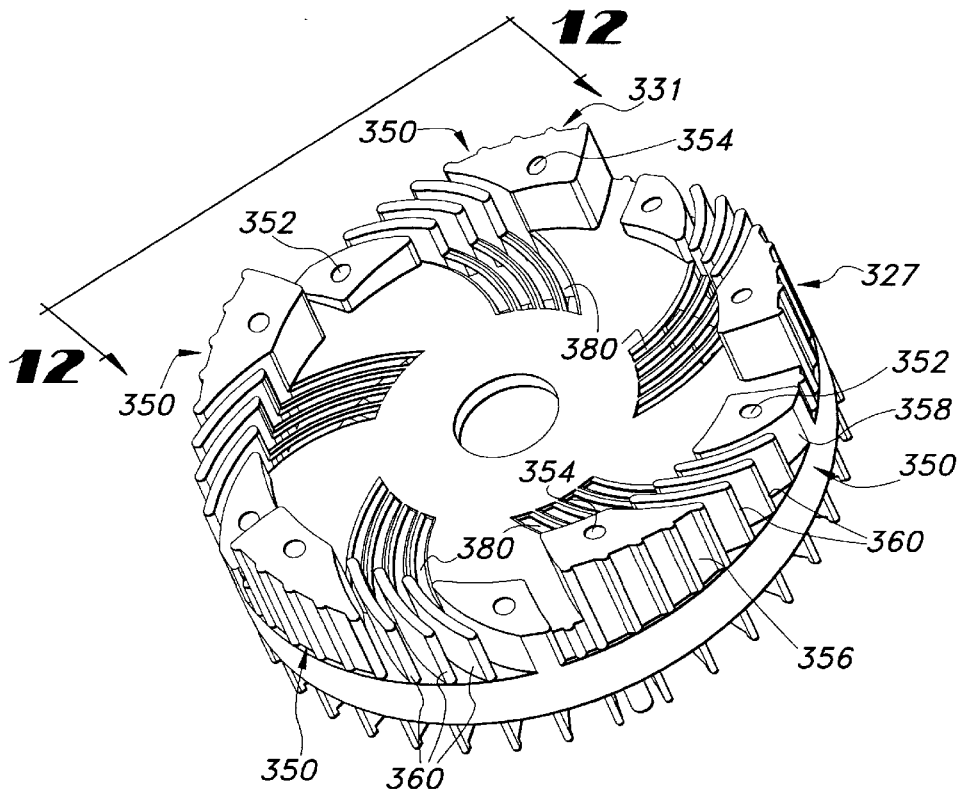
FIG. 11 is a bottom perspective view of an integrally cast motor casing having integral blade ramps and air fins cast with the bottom of the casing.
Figure 12:
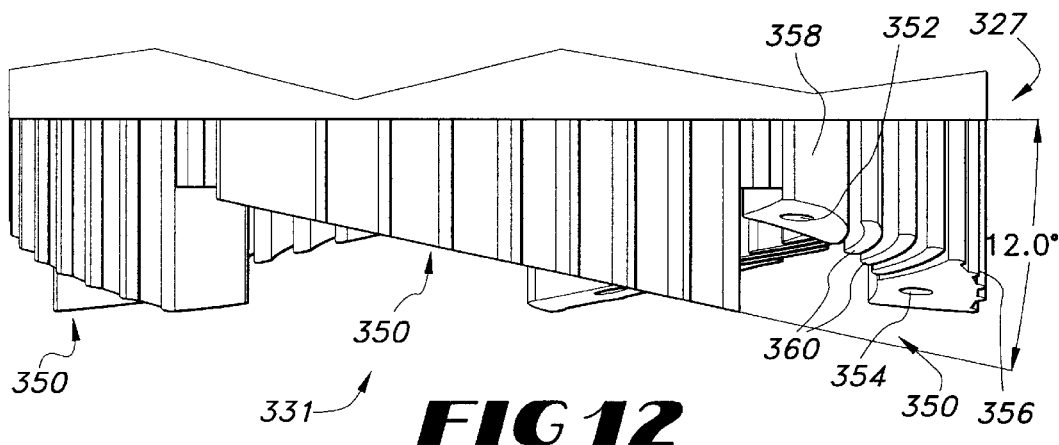
FIG. 12 is a partial side view of the embodiment of FIG. 11 depicting the side region of the bottom portion of the casing.

The embodiments depicted in FIGS. 4–6 and 7–10 specifically show end face regions of the motor casings that are substantially flat, i.e., that lie substantially in a plane perpendicular to the stator shaft. However, a significant advantage in forming the motor casing from cast aluminum is to enable casting of blade ramps integral with at least one of the upper and lower casing faces. An example of the integral casting of blade ramps with one of the top or bottom faces of the motor casing is depicted in FIGS. 11 and 12. As specifically shown, the lower or bottom casing portion 327 includes a bottom end face 331 that includes a plurality of integrally cast blade ramps 350 that enable ceiling fan blades (not shown) to be directly affixed thereto. Each ceiling fan blade would include holes or openings so that the fan blade would be connectable with the holes 352, 354, on the bottom end face 331. Disposed between upstanding mounting portions 356, 358 of each integrally cast blade ramp 350 are a plurality of fins 360 which are curved to form air foils to enable air to be scooped from the exterior of the motor casing and into the underside of the bottom end face 331 and through airflow passageways 380 to assist in cooling of the stator by ventilation. When used with the impeller mechanism as described above with respect to the FIGS. 1–3 embodiment, substantial air flow volumes and rates can be provided so that substantial air flushing through the motor casing is accomplished.

As is well known, ceiling fan motors are capable of rotation in both directions. Accordingly, when using air foils or scoops 360 on one of the end faces of the motor casing, the maximum effect is achieved only when the casing is rotated in one direction. It has been determined that the greater engine loads, and thus higher operating temperatures, take place when the ceiling fan is rotated in a direction to provide a down draft. As such, the air foils or scoops 360 can be designed to maximize the drawing of air inward into and through the casing when the motor is rotating in a down draft direction.

As shown in FIG. 12, the blade ramps are depicted as approximately 12 degrees but various blade ramp angles can be formed in accordance with well known ceiling fan blade orientations.

Figure 13:
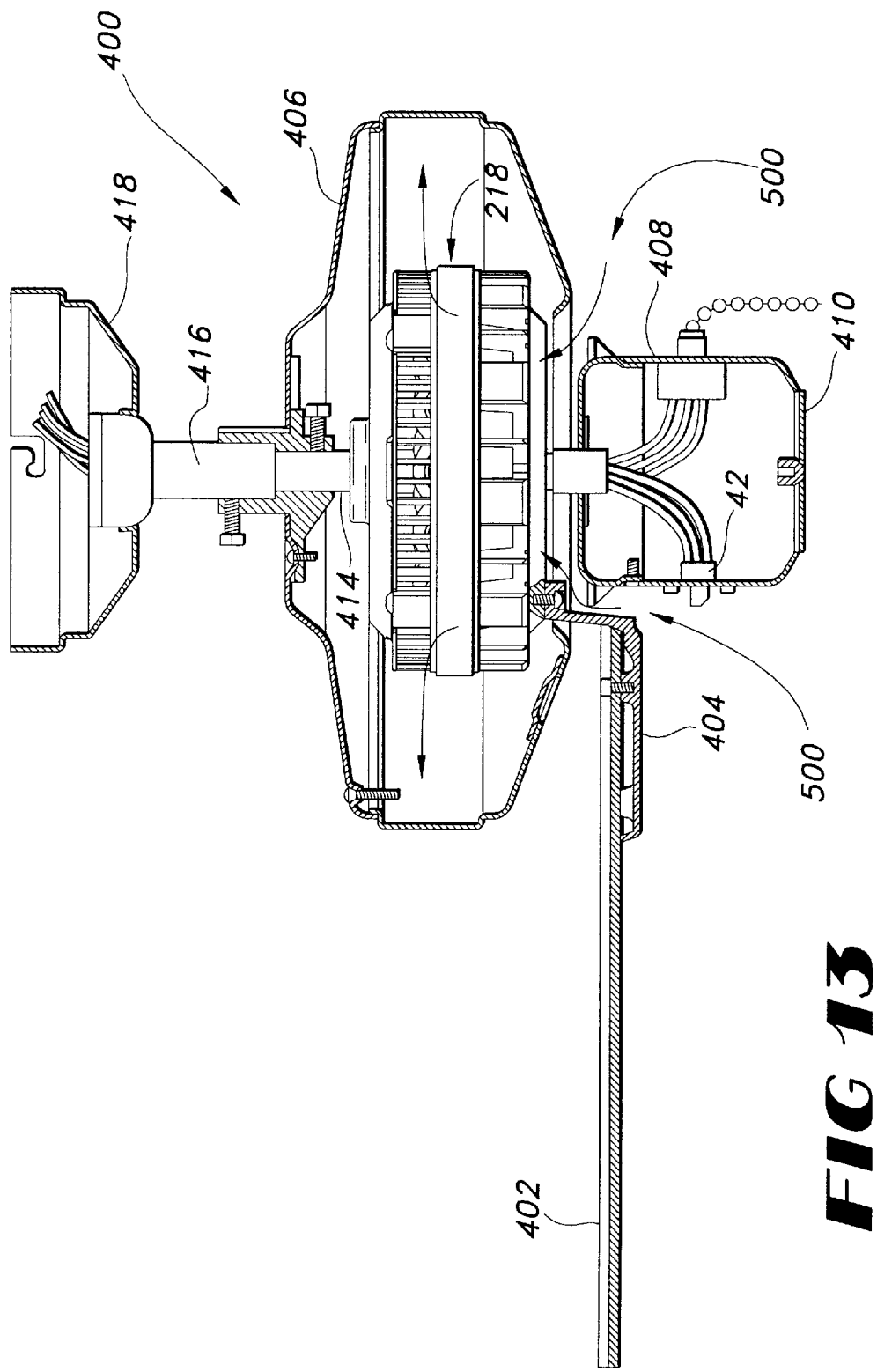
FIG. 13 is a side sectional view of a typical ceiling fan including the motor of FIGS. 7–10 mounted therein.

FIG. 13 depicts the integrally cast ceiling fan motor 218 as described with respect to FIGS. 7–10 mounted within a typical ceiling fan arrangement 400 wherein ceiling fan blades 402 are affixed to the bottom end region of the motor by blade irons 404. The ceiling fan 400 includes a ceiling fan housing 406, a switch housing 408, and a plate 410 which may be detached to enable attachment of a light housing. The ceiling fan motor stator shaft 414 is threaded and mounted to a down rod 416 which is, in turn, secured to a canopy 418 mounted to the ceiling in a conventional manner. Arrows 500 showing the air flow path when incorporating an air forcing mechanism in the embodiment of the motor of FIGS. 7–10 is depicted. Note that the housing 406 for the motor 218 must include sufficient openings (not shown) to accommodate the airflow changes that take place through the motor casing.

The above-described embodiments of the ceiling fan motor of the present invention offer significant advantages in reducing heat build-up over conventional inside-out ceiling fan motors. Operating temperatures typically are expected to be reduced by about 10 and about 20% over conventional inside-out ceiling fan motors through the use of the embodiments described above.

The foregoing detailed description of the various embodiments of the present invention is to be clearly understood as being given by way of illustration and example only, the spirit and scope of the present invention being limited solely by the appended claims.

We claim:

1. An inside-out ceiling fan motor comprising:
   a motor casing including an upper casing portion having a substantially cylindrical upper side wall region and a top end face region and a lower casing portion having a substantially cylindrical lower side wall region and a bottom end face region, said bottom end face region including a plurality of air flow passageways, said upper side wall region including a plurality of circumferential openings permitting airflow therethrough;
   an annular rotor secured with said motor casing and defining an interior space with said upper and lower side wall regions and said top and bottom end face regions;
   a stator positioned within the interior space; and
   air forcing means, disposed within said upper casing portion, for drawing air from the exterior of said motor casing inwardly through said air flow passageways in said bottom end face region of said lower casing portion, across the stator, and outwardly to the exterior of said motor casing through said circumferential openings in said upper side wall region of said upper casing portion.

2. The ceiling fan motor of claim 1 wherein:
   at least said annular rotor and said substantially cylindrical upper side wall region are integrally cast together as a single unit, said upper side wall region being formed from cast aluminum;
   said upper side wall region includes a plurality of radially oriented fins disposed in said circumferential openings and defining a plurality of side wall air flow passageways.

3. The ceiling fan motor of claim 2 wherein:
   said air forcing means comprises a centrifugal impeller connected to said casing, said centrifugal impeller including a plurality of blades rotatable with respect to said stator.

4. The ceiling fan motor of claim 3 wherein:
   said top end face region includes a substantially circular top plate overlying said radially oriented fins;
said centrifugal impeller is connected to said top plate.

5. The ceiling fan motor of claim 1 wherein:
   said air forcing means comprises a centrifugal impeller connected to said casing, said centrifugal impeller including a plurality of blades rotatable with respect to said stator.

6. The ceiling fan motor of claim 5 wherein:
   said upper side wall region includes said a plurality of cast aluminum fins disposed within said circumferential openings and defining a plurality of side wall air flow passageways;
   said upper side wall region and said annular rotor are integrally cast together as a single unit, said upper side wall region being formed from cast aluminum.

7. The ceiling fan motor of claim 6 wherein said top end face region is made of cast aluminum and is integral with said upper side wall region.

8. The ceiling fan motor of claim 7 wherein:
   said bottom end face region includes a plurality of air flow passageways;
   said cast aluminum top end face region defines a plurality of top end face air flow passageways;
   said bottom end face region defines a plurality of bottom end face airflow passageways.

9. The ceiling fan motor of claim 8 wherein said cast aluminum top end face region includes a plurality of integrally cast blade ramps.

10. The ceiling fan motor of claim 8 wherein said cast aluminum top end face region includes a plurality of air foils for directing air flow between the exterior and interior of said motor casing through said top end face air flow passageways.

11. The ceiling fan motor of claim 10 wherein said air foils are contoured to form blade ramps for mounting ceiling fan blades.

12. The ceiling fan motor of claim 1 wherein said substantially cylindrical upper side wall region is formed from cast aluminum, said upper side wall region further including a heat dissipation optimizing means for enabling heat transfer by conduction through said upper side wall region and by convection from said upper side wall region to the atmosphere adjacent said upper side wall region.

13. The ceiling fan motor of claim 1 wherein at least one of said substantially cylindrical upper side wall region and said lower casing portion is formed from cast aluminum.

14. The ceiling fan motor of claim 13 wherein a plurality of cast aluminum fins are disposed within said circumferential openings.

15. The ceiling fan motor of claim 13 wherein said cast aluminum upper side wall region and said lower casing portion includes a plurality of radially oriented fins to define air flow passageways.

16. An inside-out ceiling fan motor comprising: a motor casing including an upper casing portion having a substantially cylindrical upper side wall region and a top end face region and a lower casing portion having a substantially cylindrical lower side wall region and a bottom end face region; an annular rotor secured with said motor casing and defining an interior space with said upper and lower side wall regions and said top and bottom end face regions; a stator positioned within the interior space; and air forcing means for drawing air from the exterior of said motor casing inwardly through one of said upper and lower casing portions, across the stator, and outwardly to the exterior of said motor casing through the other of said upper and lower casing portions; wherein said air forcing means comprises a centrifugal impeller connected to said casing and disposed within one of said upper casing portion and said lower casing portion, said centrifugal impeller including a plurality of blades rotatable with respect to said stator; wherein said top end face region and said bottom end face region include a plurality of air flow passageways; said top end face region defines a plurality of top end face air flow passageways; said bottom end face region defines a plurality of bottom end face air flow passageways; at least one of said upper side wall region and said lower side wall region includes a plurality of circumferential openings permitting airflow therethrough; said centrifugal impeller draws air from the exterior of said motor casing inwardly through at least one of said plurality of top end face air flow passageways and said plurality of bottom end face air flow passageways, across the stator, and forces the air outwardly to the exterior of said motor casing through said circumferential openings.

17. An inside-out ceiling fan motor comprising:
a motor casing including an upper casing portion having a substantially cylindrical upper side wall region and a top end face region and a lower casing portion having a substantially cylindrical lower side wall region and a bottom end face region;
an annular rotor secured with said motor casing and defining an interior space with said upper and lower side wall regions and said top and bottom end face regions;
a stator positioned within the interior space; and
wherein at least one of said top end face region and said bottom end face region includes a plurality of air flow passageways and at least one of said upper side wall region and said lower side wall region includes a plurality of circumferential openings permitting radial airflow therethrough;
wherein a plurality of radially oriented fins are disposed in said circumferential openings and define a plurality of side wall air flow passageways.

18. The ceiling fan motor of claim 17, wherein:
at least said annular rotor and said substantially cylindrical upper side wall region are integrally cast together as a single unit, said upper side wall region being formed from cast aluminum;
said upper side wall region includes said plurality of circumferential openings and said plurality of radially oriented fins disposed in said circumferential openings and defining said plurality of side wall air flow passageways.

19. An inside-out ceiling fan motor comprising:
a motor casing including an upper casing portion having a substantially cylindrical upper side wall region and a top end face region and a lower casing portion having a substantially cylindrical lower side wall region and a bottom end face region;
an annular rotor secured with said motor casing and defining an interior space with said upper and lower side wall regions and said top and bottom end face regions;
a stator positioned within the interior space; and
wherein at least one of said top end face region and said bottom end face region includes a plurality of air flow passageways and at least one of said upper side wall region and said lower side wall region includes a plurality of circumferential openings permitting radial airflow therethrough.

20. The ceiling fan motor of claim 19, wherein:
at least said annular rotor and said substantially cylindrical upper side wall region are integrally cast together as a single unit, said upper side wall region being formed from cast aluminum;
said upper side wall region includes said plurality of circumferential openings and a plurality of radially oriented fins disposed in said circumferential openings and defining a plurality of side wall air flow passageways.

21. An inside-out ceiling fan motor comprising:
an integrally cast motor casing having a substantially cylindrical side wall and a bottom end face;
a substantially circular top plate connected with and overlying said integrally cast motor casing;
an annular rotor having a rotor top face, a rotor bottom face and a cylindrical internal rotor wall, said annular rotor integrally cast as a single unit with said cylindrical side wall to form an upper casing region defined by said top plate and an upper region of said cylindrical side wall, at lower casing region defined by said bottom end face and a lower region of said cylindrical side wall, and further defining a stator space within the region bounded by said internal rotor wall;
a stator positioned within said stator space and having a stator shaft affixed centrally thereto and oriented along a major axis of said substantially cylindrical side wall, one end or said stator shaft extending through said top plate and the other end of said stator shaft extending through said bottom end face, wherein said integrally cast motor casing and annular rotor is rotatable about said stator;
wherein said upper region of said cylindrical side wall includes a plurality of radially extending air flow passageways extending through the cylindrical side wall to define a substantially radial air flow path between said upper casing region and the exterior of said motor casing;
wherein said bottom end face includes a plurality of openings for axially extending airflow passageways extending upward from the bottom end face to define a substantially axial air flow path between said lower casing region and the exterior of said motor casing;
an impeller within said upper casing region for drawing air from the exterior of the motor casing through the openings of said bottom end face, and through the axially extending airflow passageways, across the stator, and outwardly through the radially extending airflow passageways of the upper region of said substantially cylindrical side wall.

22. The ceiling fan motor of claim 21 wherein said plurality of radially extending airflow passageways are formed from a plurality of radially oriented integrally cast fins.

23. The ceiling fan motor of claim 22 wherein said radially oriented integrally cast fins are substantially linear and free of curves and bends.

24. The ceiling fan motor of claim 21 wherein:
said impeller is connected to said top plate.

25. The ceiling fan motor of claim 24 further comprising:
top and bottom bearings positioned within said upper and lower casing regions, respectively, said stator shaft being journaled in said top and bottom bearings;
wherein said impeller includes a top bearing plate for retaining said top bearing to said top plate.

26. The ceiling fan motor of claim 21 wherein said impeller is a centrifugal impeller having a plurality of blades extending in a substantially radial direction with respect to said stator shaft.

27. The ceiling fan motor of claim 21 wherein said integrally cast motor casing is cast of aluminum.

28. The ceiling fan motor of claim 21 wherein said bottom end face includes means for attaching ceiling fan blades.

29. An inside-out ceiling fan motor comprising:

a motor casing including an upper casing portion having a substantially cylindrical upper side wall region and a top end face region and a lower casing portion having a substantially cylindrical lower side wall region and a bottom end face region, said bottom end face region including a plurality of air flow passageways, said upper side wall region including a plurality of circumferential openings permitting airflow therethrough;

an annular rotor secured with said motor casing and defining an interior space with said upper and lower side wall regions and said top and bottom end face regions;

a stator positioned within the interior space; and an impeller disposed within said upper casing portion whereby air is drawn from the exterior of said motor casing inwardly through said air flow passageways in said bottom end face region of said lower casing portion, across the stator and is then forced outwardly to the exterior of said motor casing through said circumferential openings in said upper side wall region of said upper casing portion.

30. The ceiling fan motor of claim 29, wherein:

said stator includes a stator shaft affixed substantially centrally thereto and oriented along a major axis of said casing, one end of said stator shaft extending through said top end face region and the other end of said stator shaft extending through said bottom end face region, wherein said motor casing and said annular rotor are rotatable about said stator and said stator shaft;

said impeller includes a plurality of impeller blades which extend radially outwardly from said stator shaft.

31. The ceiling fan motor of claim 30, further comprising:

a top cover plate positioned over said top end face region; wherein said impeller is attached to an interior surface of said top cover plate.

32. The ceiling fan motor of claim 29, wherein:

said upper casing portion, said annular rotor, and said lower casing portion are integrally cast together as a single unit.

33. The ceiling fan motor of claim 32, wherein:

said upper side wall region includes a plurality of radially oriented fins disposed in said circumferential openings and defining a plurality of side wall air flow passageways;

said radially oriented fins being substantially linear and free of curves and bends.

34. An inside-out ceiling fan motor comprising: a motor casing including an upper casing portion having a substantially cylindrical upper side wall region and a top end face region and a lower casing portion having a substantially cylindrical lower side wall region and a bottom end face region; an annular rotor secured with said motor casing and defining an interior space with said upper and lower side wall regions and said top and bottom end face regions; a stator positioned within the interior space; and a centrifugal impeller connected to said casing and disposed within one of said upper casing portion and said lower casing portion, said centrifugal impeller including a plurality of blades rotatable with respect to said stator whereby air is drawn from the exterior of said motor casing inwardly through one of said upper and lower casing portions, across the stator and is forced outwardly to the exterior of said motor casing through the other of said upper and lower casing portions; wherein said top end face region and said bottom end face region include a plurality of air flow passageways; said top end face region defines a plurality of top end face air flow passageways; said bottom end face region defines a plurality of bottom end face air flow passageways; at least one of said upper side wall region and said lower side wall region includes a plurality of circumferential openings permitting airflow therethrough; said centrifugal impeller draws air from the exterior of said motor casing inwardly through at least one of said plurality of top end face air flow passageways and said plurality of bottom end face air flow passageways, across the stator, and forces the air outwardly to the exterior of said motor casing through said circumferential openings.

35. The ceiling fan motor of claim 34, further comprising:

a top cover plate positioned over said top end face region; wherein said stator includes a stator shaft affixed substantially centrally thereto and oriented along a major axis of said casing, one end of said stator shaft extending through said top plate and the other end of said stator shaft extending through said bottom end face region, wherein said casing and said annular rotor are rotatable about said stator and said stator shaft;

wherein said centrifugal impeller includes a plurality of blades which extend radially outwardly from said stator shaft.

* * * * *